(12) United States Patent
Knudson et al.

(10) Patent No.: US 7,039,935 B2
(45) Date of Patent: May 2, 2006

(54) PROGRAM GUIDE SYSTEM WITH FLIP AND BROWSE ADVERTISEMENTS

(75) Inventors: Edward B. Knudson, Littleton, CO (US); Joel G. Hassell, Arvada, CO (US); Connie T. Marshall, Muskogee, OK (US); Thomas R. Lemmons, Sand Springs, OK (US); Steven J. Reynolds, Littleton, CO (US); Robert A. Knee, Lansdale, PA (US); Kenneth F. Carpenter, Jr., Mount Laurel, NJ (US); William L. Thomas, Bixby, OK (US); W. Benjamin Herrington, Tulsa, OK (US); Steven C. Williamson, Broken Arrow, OK (US); Michael D. Ellis, Boulder, CO (US); Donald W. Allison, Tulsa, OK (US)

(73) Assignee: United Video Properties, Inc., Los Angeles, CA (US)

( * ) Notice: Subject to any disclaimer, the term of this patent is extended or adjusted under 35 U.S.C. 154(b) by 586 days.

(21) Appl. No.: 10/127,220

(22) Filed: Apr. 19, 2002

(65) Prior Publication Data

US 2002/0120933 A1 Aug. 29, 2002

Related U.S. Application Data

(63) Continuation of application No. 09/070,555, filed on Apr. 30, 1998, now Pat. No. 6,564,379.

(51) Int. Cl.
*H04N 5/445* (2006.01)
(52) U.S. Cl. .............................. 725/42; 725/43; 725/41
(58) Field of Classification Search .................. 725/41, 725/42, 51, 52, 57, 60, 43; 348/564, 569, 348/584
See application file for complete search history.

(56) References Cited

U.S. PATENT DOCUMENTS

| 4,694,490 A | 9/1987 | Harvey et al. ............... 380/20 |
| 5,151,789 A | 9/1992 | Young ...................... 358/194.1 |

(Continued)

FOREIGN PATENT DOCUMENTS

| EP | 0 772 360 A2 | 5/1997 |
| JP | 59-141878 | 8/1984 |

(Continued)

OTHER PUBLICATIONS

U.S. Appl. No. 60/061,119, filed Oct. 6, 1997, Ward et al.

* cited by examiner

*Primary Examiner*—Victor R. Kostak
(74) *Attorney, Agent, or Firm*—Fish & Neave IP Group of Ropes & Grey LLP; Andrew Van Court; Hong S. Lin

(57) ABSTRACT

An interactive television program guide is provided in which advertisements may be displayed in program listings display regions on program guide screens. The program listings display regions may be browse displays or flip displays. The program guide screens contain video for the current channel to which the user is tuned. The program listings display regions containing the advertisements may be overlaid on top of the current channel. Alternatively, the video for the current channel may be provided in a reduced-size video window. The advertisements may contain video. The advertisements may be used to promote television programs and conventional goods and services. Advertisements may be selectable. When a user selects an advertisement, the program guide provides the user with an opportunity to order products or services, request information, set reminders for upcoming programs, view program descriptions, record programs, or take other such actions.

124 Claims, 14 Drawing Sheets

U.S. PATENT DOCUMENTS

| | | | |
|---|---|---|---|
| 5,212,553 A | 5/1993 | Maruoka | 358/188 |
| 5,335,277 A | 8/1994 | Harvey et al. | 380/20 |
| 5,353,121 A | 10/1994 | Young et al. | 348/563 |
| 5,452,012 A | 9/1995 | Saitoh | 348/563 |
| 5,485,197 A | 1/1996 | Hoarty | 348/7 |
| 5,559,548 A | 9/1996 | Davis et al. | 348/6 |
| 5,559,549 A | 9/1996 | Hendricks et al. | 348/6 |
| 5,559,550 A | 9/1996 | Mankovitz | 348/6 |
| 5,585,866 A | 12/1996 | Miller et al. | 348/731 |
| 5,589,892 A | 12/1996 | Knee et al. | 348/731 |
| 5,600,364 A | 2/1997 | Hendricks et al. | 348/1 |
| 5,600,573 A | 2/1997 | Hendricks et al. | 348/514 |
| 5,635,978 A | 6/1997 | Alten et al. | 348/7 |
| 5,659,350 A | 8/1997 | Hendricks et al. | 348/6 |
| 5,682,195 A | 10/1997 | Hendricks et al. | 348/6 |
| 5,687,331 A | 11/1997 | Volk et al. | 395/327 |
| 5,734,853 A | 3/1998 | Hendricks et al. | 395/352 |
| 5,740,549 A | 4/1998 | Reilly et al. | 705/14 |
| 5,781,246 A | 7/1998 | Alten et al. | 348/569 |
| 5,801,747 A | 9/1998 | Bedard | 348/1 |
| 5,805,154 A | 9/1998 | Brown | 345/327 |
| 5,808,694 A | 9/1998 | Usui et al. | 348/569 |
| 5,822,123 A | 10/1998 | Davis et al. | 348/564 |
| 5,830,068 A | 11/1998 | Brenner et al. | 463/42 |
| 5,838,314 A | 11/1998 | Neel et al. | 345/327 |
| 5,844,620 A | 12/1998 | Coleman et al. | 348/461 |
| 5,900,905 A | 5/1999 | Shoff et al. | 348/12 |
| 5,986,650 A * | 11/1999 | Ellis et al. | 725/40 |
| 6,064,376 A | 5/2000 | Berezowski et al. | 345/327 |
| 6,151,059 A | 11/2000 | Schein et al. | 348/13 |
| 6,177,931 B1 | 1/2001 | Alexander et al. | 345/327 |
| 6,240,555 B1 | 5/2001 | Shoff et al. | 725/110 |
| 6,263,501 B1 | 7/2001 | Schein et al. | 725/39 |
| 6,275,268 B1 | 8/2001 | Ellis et al. | 348/564 |
| 6,323,931 B1 | 11/2001 | Fujita et al. | 348/552 |
| 6,396,546 B1 | 5/2002 | Alten et al. | 348/569 |

FOREIGN PATENT DOCUMENTS

| | | |
|---|---|---|
| JP | 61-50470 | 3/1986 |
| WO | WO 95/07003 | 3/1995 |
| WO | WO 95/32585 | 11/1995 |
| WO | WO 96/09721 | 3/1996 |
| WO | WO 96/34491 | 10/1996 |
| WO | WO 97/07656 | 3/1997 |
| WO | WO 97/13368 | 4/1997 |
| WO | WO 97/18675 | 5/1997 |
| WO | WO 97/31480 | 8/1997 |
| WO | WO 97/42763 | 11/1997 |
| WO | WO 97/48230 | 12/1997 |
| WO | WO 97/49237 | 12/1997 |
| WO | WO 97/49242 | 12/1997 |
| WO | WO 98/06219 | 2/1998 |
| WO | WO 98/17064 | 4/1998 |
| WO | WO 98/27723 | 6/1998 |
| WO | WO 98/56172 | 12/1998 |
| WO | WO 99/04561 | 1/1999 |
| WO | WO 99/29109 | 6/1999 |
| WO | WO 99/45702 | 9/1999 | ns
PROGRAM GUIDE SYSTEM WITH FLIP AND BROWSE ADVERTISEMENTS

CROSS REFERENCE TO RELATED APPLICATION

This application is a continuation of U.S. patent application Ser. No. 09/070,555, filed Apr. 30, 1998, which is hereby incorporated by reference herein in its entirety.

BACKGROUND OF THE INVENTION

This invention relates to interactive television program guides, and more particularly, to techniques for presenting advertising to users of such television program guides.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listings by theme (e.g., movies, sports, etc.) or by title (i.e, alphabetically). A user may obtain additional information for a program by placing a highlight region on a desired program listing and pressing an "info" key. The user may purchase a pay program from the program guide or may set a reminder for a future program by placing the highlight region on a program listing and pressing an "OK" key. Some systems allow the user to select a program for recording by placing the highlight region on a program listing and pressing a "record" key.

Program guides with a browse or flip display are capable of generating an overlay containing program listings information for a single channel. Browse displays contain information on programs available on channels other than the channel to which the user is currently tuned. The user may browse through program listings for other channels and other times using cursor keys, without changing the current channel. Flip displays contain information for the current channel. When the flip display is activated, using the up or down channel keys causes the both the current channel to change and the flip display to be updated accordingly.

Although flip and browse displays are useful, it would be desirable if more information were available to the user of such displays. For example, it would be desirable if advertisements were available in flip and browse displays to provide the users of such displays with additional information.

It is therefore an object of the present invention to provide an interactive television program guide system that provides advertising on flip and browse displays.

It is also an object of the invention to provide an interactive television program guide system with special effects for removing such flip and browse displays from the user's television screen.

SUMMARY OF THE INVENTION

These and other objects of the invention are accomplished in accordance with the principles of the present invention by providing a system having an interactive television program guide that provides video (including audio) for the current channel and a program listings display region containing a program listing for a single channel and an advertisement. The program listings display region may be either a browse display in which the channel or time for the program listing may be different than the current channel or time or a flip display in which the channel for the program listing and the current channel are the same.

A browse display may be provided in which a user may change the channel for the program listing by navigating a highlight to an advertisement adjacent to the program listing with a cursor key and by activating that cursor key again after the advertisement has been highlighted.

The advertisement may be selectable. When the user selects the advertisement, the program guide may take an appropriate action. If the advertisement is related to programming, selecting the advertisement may direct the program guide to perform a programming related task such as setting a reminder for a program, tuning to a program, recording a program, ordering a pay-per-view program, etc. If the advertisement is a conventional advertisement, selecting the advertisement may direct the program guide to assist in the ordering of a product or service, to process an inquiry for additional information, to display additional information, etc.

Multiple advertisements may be provided within the program listings display region. Advertisements may contain text, graphics, and video.

The program listings display region may be removed by the program guide using a special effect such as a wipe, a dissolve, a fade, etc.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
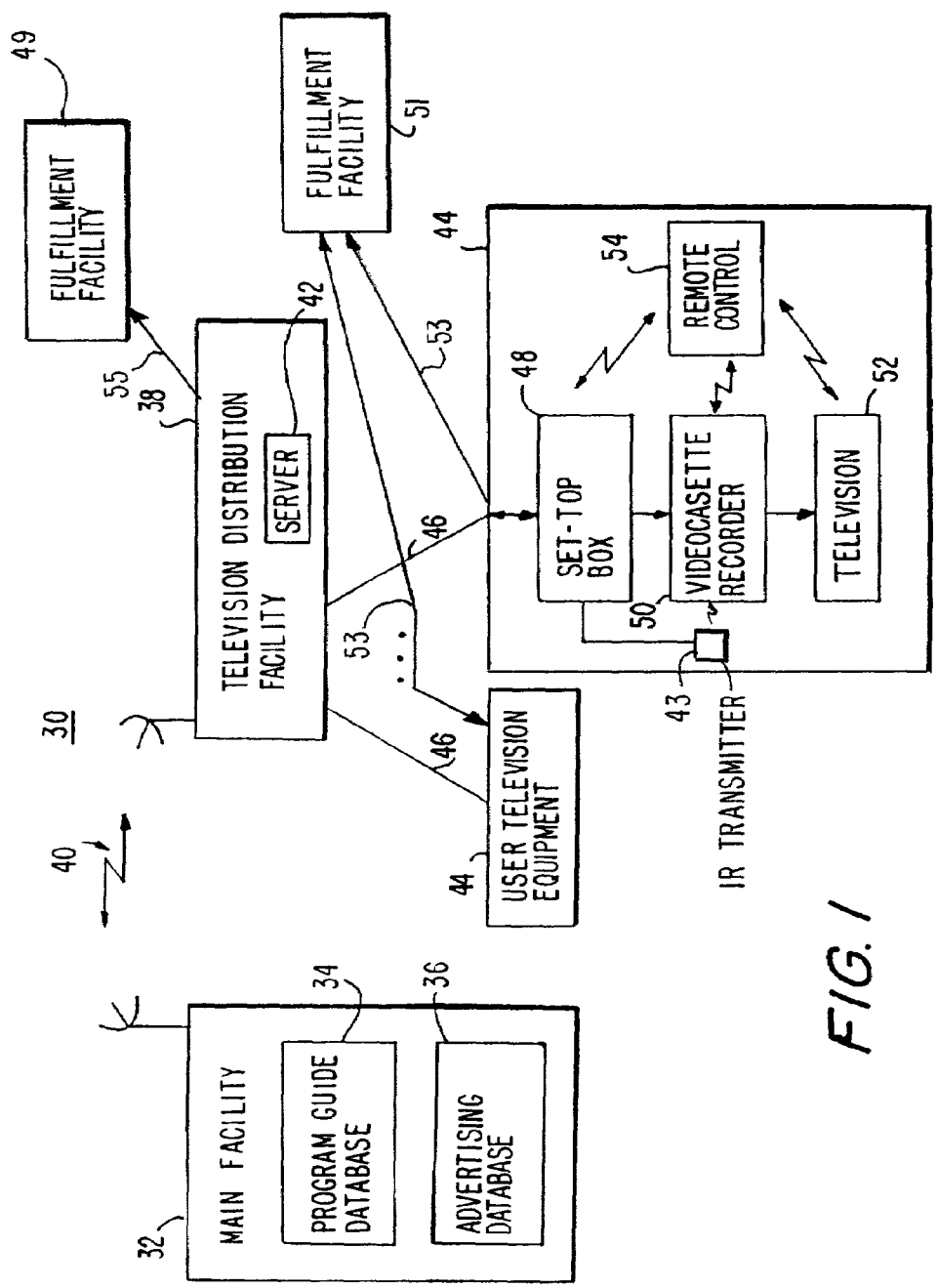
FIG. 1 is a diagram of a system in which an interactive television program guide is implemented in accordance with the present invention.

An illustrative program guide system 30 in accordance with the present invention is shown in FIG. 1. Main facility 32 contains a program guide database 34 for storing program guide information such as television program guide listings data, pay-per-view ordering information, television program promotional information, etc. Main facility 32 also contains an advertising database 36 for storing advertising information. Information from databases 34 and 36 may be transmitted to television distribution facility 38 via communications link 40. Link 40 may be a satellite link, a telephone network link, a cable or fiber optic link, a microwave link, a combination of such links, or any other suitable communications path. If it is desired to transmit video signals (e.g., for advertising and promotional videos) over link 40 in addition to data signals, a relatively high bandwidth link such as a satellite link is generally preferable to a relatively low bandwidth link such as a telephone line.

Television distribution facility 38 is a facility for distributing television signals to users, such as a cable system headed, a broadcast distribution facility, or a satellite television distribution facility.

The program guide information transmitted by main facility 32 to television distribution facility 38 includes television program listings data such as program times, channels, titles, descriptions, etc. Transmitted program information also includes pay program data such as pricing information for individual programs and subscription channels, time windows for ordering programs and channels, telephone numbers for placing orders that cannot be impulse ordered, etc. The advertising information transmitted by main facility 32 to television distribution facility 38 includes text, graphics, and video advertisements for various products and services. If desired, some of the program guide and advertising information may be provided using data sources at facilities other than main facility 32. For example, data related to pay program order processing (e.g., billing data and the like) may be generated by an order processing and billing system that is separate from main facility 32 and separate from television distribution facility 38. Similarly, advertising information may be generated by an advertising facility that is separate from main facility 32 and television distribution facility 38.

Regardless of its source, advertising information may be maintained on a server 42 within television distribution facility 38 if desired. Server 42 may be capable of handling text, graphics, and video.

Television distribution facility 38 distributes program guide and advertising information to the user television equipment 44 of multiple users via communications paths 46. User television equipment may be any suitable equipment for providing television to the user that contains sufficient processing capabilities to implement an interactive television program guide. Paths 46 may be cable links, fiber optic links, satellite links, broadcast links, or other suitable link or combination of such links. Any suitable communications scheme may be used to transmit data over paths 46, including in-band transmissions, out-of-band transmissions, digital transmissions, analog transmissions, cable transmissions, satellite transmissions, over-the-air transmissions, multichannel multipoint distribution services (MMDS) transmissions, etc.

If desired, program guide data may be distributed over an out-of-band channel on paths 46 or over an in-band path such as the vertical blanking interval (VBI). Advertising information may be distributed using any of a number of suitable techniques. For example, text and graphics advertisements may be distributed over an out-of-band channel using an out-of-band modulator. Video advertisements may also be distributed in this way, although large quantities of video information may be more efficiently distributed using one or more digital channels on path 46. Such digital channels may also be used for distributing text and graphics.

Each user has a receiver, which is typically a set-top box such as set-top box 48, but which may be other suitable television equipment such as an advanced television receiver into which circuitry similar to set-top-box circuitry has been integrated or a personal computer television (PC/TV). Program guide data is distributed to set-top boxes 48 periodically. Television distribution facility 38 may also poll set-top boxes 48 periodically for certain information (e.g., pay program account information or information regarding programs that have been purchased and viewed using locally-generated authorization techniques). Main facility 32 preferably contains a processor to handle information distribution tasks. Each set-top box 48 preferably contains a processor to handle tasks associated with implementing a program guide application on the set-top box 48. Television distribution facility 38 may contain a processor for handling tasks associated with the distribution of program guide and advertising information.

Each set-top box 48 is typically connected to an optional videocassette recorder 50 so that selected television programs may be recorded. Each videocassette recorder 50 is connected to a television 52. To record a program, set-top box 48 tunes to a particular channel and sends control signals to videocassette recorder 50 (e.g., using infrared transmitter 43) that direct videocassette recorder 50 to start and stop recording at the appropriate times.

During use of the interactive television program guide implemented on set-top box 48, television program listings may be displayed on television 52. Each set-top box 48, videocassette recorder 50, and television 52 may be controlled by one or more remote controls 54 or any other suitable user input interface such as a wireless keyboard, mouse, trackball, dedicated set of keys, etc.

Communications paths 46 preferably have sufficient bandwidth to allow television distribution facility 38 to distribute scheduled television programming, pay programming, advertising and other promotional videos, and other video information to set-top boxes 44 in addition to non-video program guide and advertising data. Multiple television and audio channels (analog, digital, or both analog and digital) may be provided to set-top boxes 48 via communications paths 46. If desired, program listings and advertising information may be distributed by one or more distribution facilities that are similar to but separate from television distribution facility 38 using communications paths that are separate from communications paths 46.

Certain functions such as pay program purchasing may require set-top boxes 48 to transmit data to television distribution facility 38 over communications paths 46. If desired, such data may be transmitted over telephone lines or other separate communications paths. If functions such as these are provided using facilities separate from television distribution facility 38, some of the communications involving set-top boxes 48 may be made directly with the separate facilities.

Users may interactively order additional information, products, or services. Such orders may be satisfied by fulfillment facilities 49 and 51. If desired, orders may be transmitted directly to fulfillment facilities such as fulfillment facility 51 via links 53, which may be telephone links, the Internet, or other suitable communications links. Orders may also be transmitted to television distribution facility 38 via links 46, where the billing system of the television distribution facility may be used. After the television distribution facility 38 has processed the user's order, television distribution facility 38 may transmit the order to fulfillment facility 49 via link 55.

A number of suitable techniques may be used to distribute videos related to advertising. For example, if each path 46 includes a number of traditional analog television channels, one or more of these channels may be used to support a number of digital channels. The bandwidth of each analog channel that is used to support digital channels may support ten or more of such digital channels. If desired, videos may be provided from server 42 in a continuously looped arrangement on these digital channels. Information provided to set-top box 48 may then be used to determine which digital channels to tune to when it is time to display a desired video. Alternatively, videos may be provided on demand. With this approach, set-top box 48 and server 42 may negotiate to determine a channel on which to provide the desired video. Videos that originate from main facility 32 or a separate facility are preferably distributed to user television equipment 44 using these or other suitable techniques.

Figure 2:
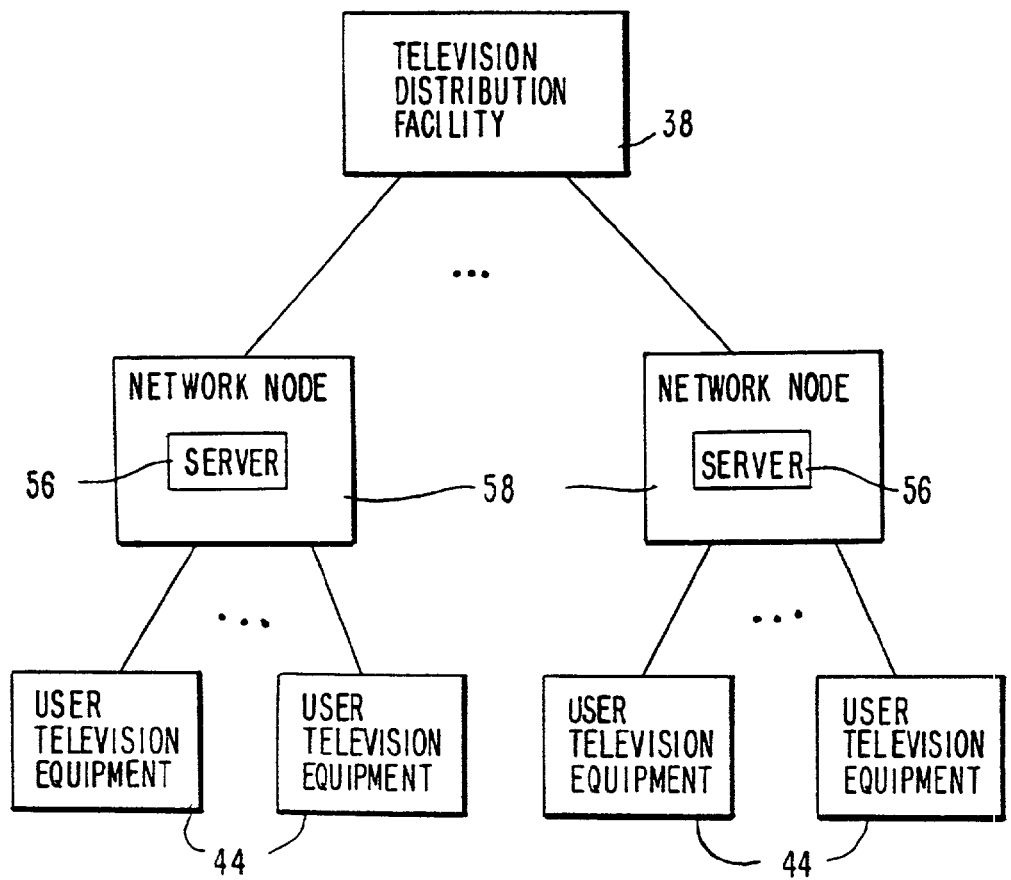
FIG. 2 is a diagram of a system similar to the system of FIG. 1 showing how servers may be located at network nodes in accordance with the present invention.

As shown in FIG. 2, the capabilities of server 42 may be provided using servers 56 located at network nodes 58. Servers such as servers 56 may be used instead of server 42 or may be used in conjunction with a server 42 located at the television distribution facility.

Graphics information for advertisements may be downloaded periodically (e.g., once per day) to set-top boxes 48 of FIG. 1 and stored locally. The graphics information may be accessed locally when needed by the program guide implemented on set-top box 48. Alternatively, graphics information may be provided in a continuously-looped arrangement on one or more digital channels on paths 46. With such a continuously-looped arrangement, a map indicating the location of the latest graphics information is preferably downloaded periodically to set-top boxes 48 (e.g., once per day). This allows the content on the digital channels to be updated. The program guides on set-top boxes 48 may use the map to locate desired graphics information on the digital channels. Another approach involves using a server such as server 42 or servers 56 (FIG. 2) to provide the graphics information after a set-top box 48 and that server have negotiated to set up a download operation. A bitmap or other suitable set of graphics information may then be downloaded from the server to the set-top box. If desired, the server may download instructions informing the set-top box where the desired graphics information can be located on a particular digital channel. The graphics information can be updated periodically if the server that is responsible for downloading the instructions for informing the set-top box of the location of the graphics information is also updated periodically.

Text information for advertisements may be provided to set-top boxes 48 using the same paths that are used for distributing program guide data. For example, advertising data from database 36 of FIG. 1 may be provided to set-top boxes 48 using link 40, television distribution facility 38, and paths 46. The text information may be stored locally in set-top boxes 48 and updated periodically (e.g., once per day).

Text information, graphics information, and videos for advertisements may also be distributed using a combination of these techniques or any other suitable technique.

If desired, advertising related information (whether video, graphics, text, or a combination of video, graphics, and text) may be presented to the user based on the user's interests, as determined by the user's interactions with the program guide. This is described in Knudson et al. U.S. patent application Ser. No. 09/034,939, filed Mar. 4, 1998, which is hereby incorporated by reference herein in its entirety.

Figure 3:
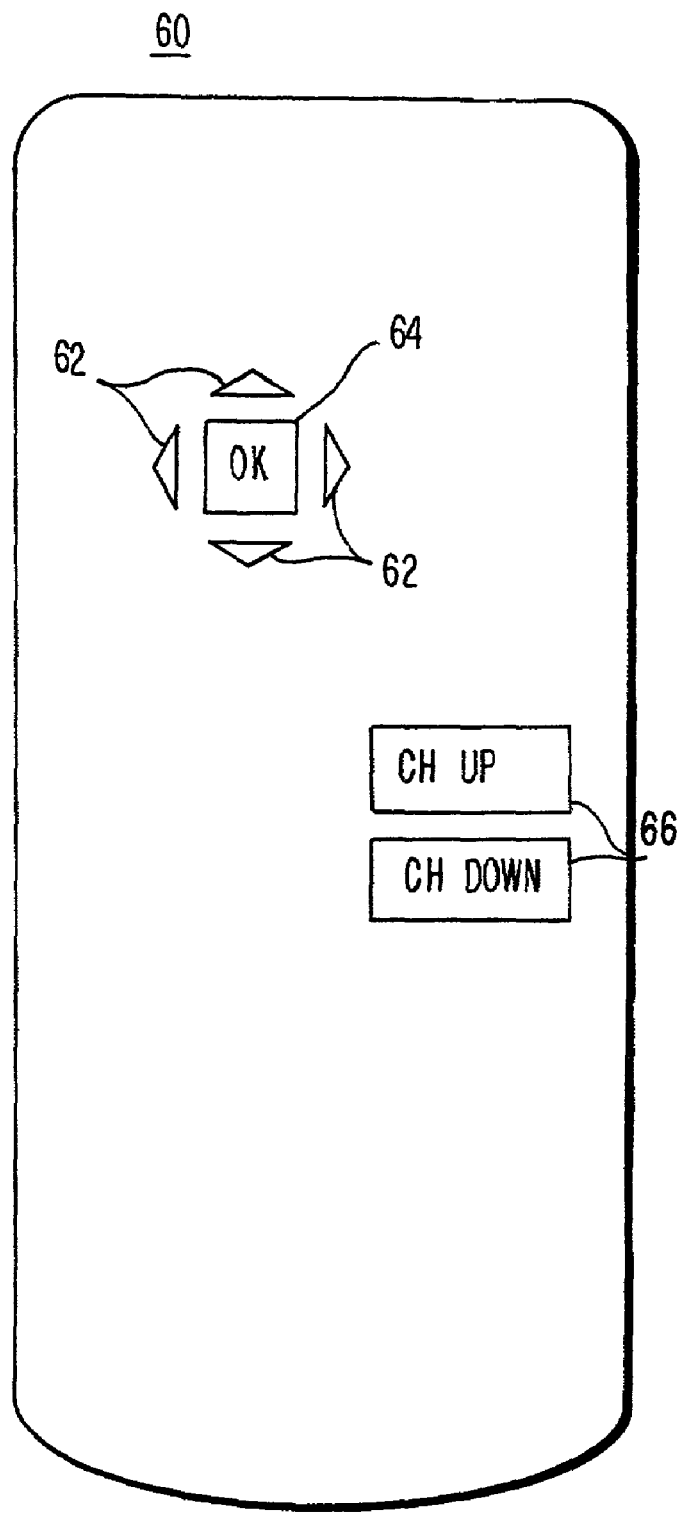
FIG. 3 is a simplified plan view of an illustrative remote control in accordance with the present invention.

A suitable remote control 60 that may be used to operate the program guide implemented on user television equipment 44 is shown in FIG. 3. Remote control 60 has cursor keys 62, a select or "OK" key 64, channel up and down keys 66. Remote control 60 also has various other keys for controlling the program guide and user television equipment that are not shown to avoid over-complicating the drawings.

Figure 4:
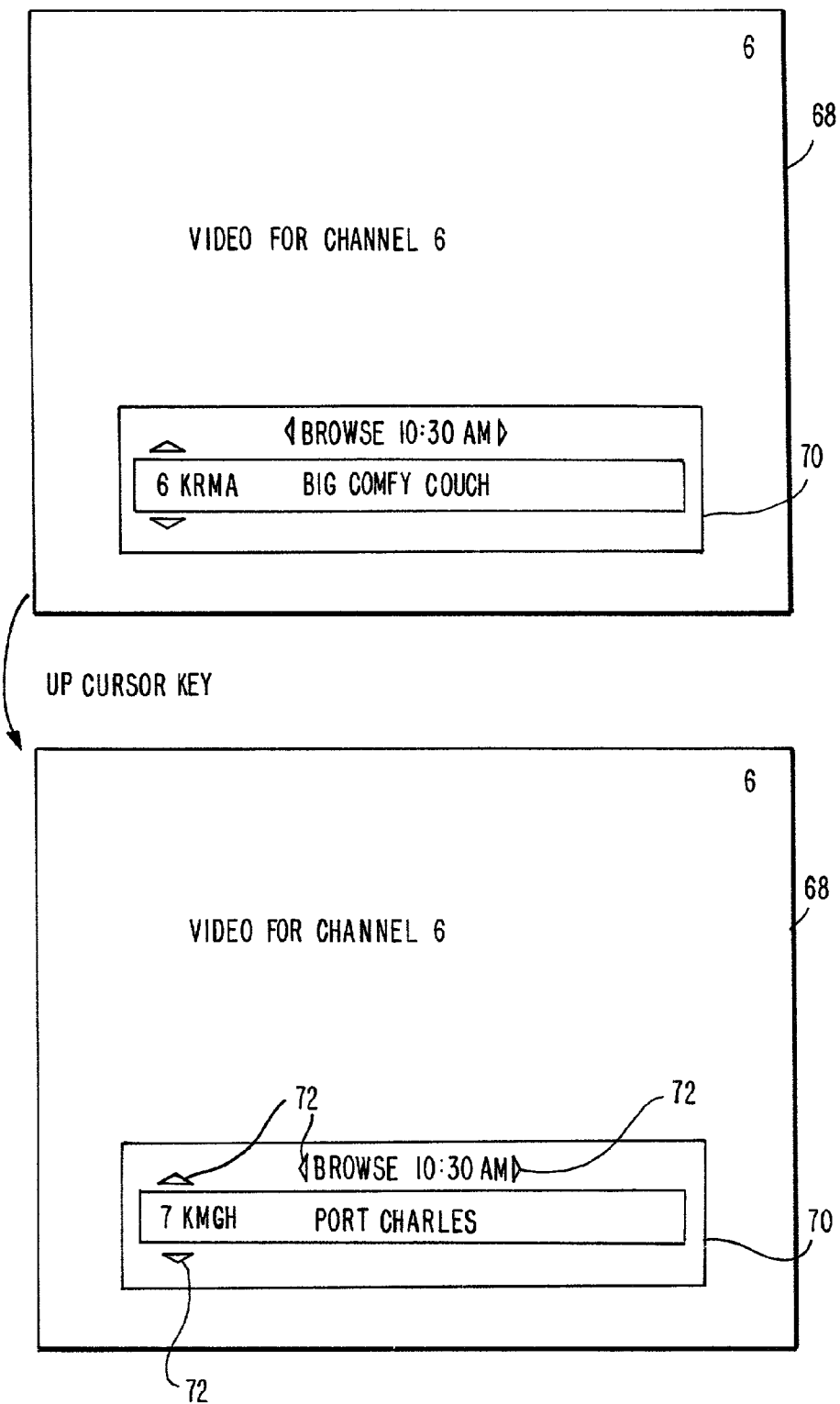
FIG. 4 is a diagram illustrating the operation of conventional browse displays.

A conventional program guide browse display arrangement is shown in FIG. 4. Video for the current channel to which the user's set-top box is tuned (i.e., the current channel that the user is viewing) is displayed on the user's television screen 68. When the user presses a remote control cursor key, browse display 70 is provided as an overlay on top of screen 68. Initially, browse display 70 contains program listings information for the current channel and time (e.g., channel 6 and 10:30 AM), as shown on the upper screen in FIG. 4. If the user presses a cursor key, the video for the current channel that is displayed on screen 68 is not changed, but the program listings information in browse display 70 is changed to the next available channel (e.g., channel 7), as shown on the lower screen in FIG. 4. As indicated by arrows 72, the user may use cursor keys to browse program listing for various other channels and times without disturbing the video for the current channel that is displayed on screen 68. If the user locates a currently airing program of interest, the user may press a remote control "OK" key that directs the program guide to tune to the channel for that program. Pressing the "OK" key when the program listing in the browse display is a future program directs the program guide to provide an opportunity to set a reminder for that program.

Figure 5:
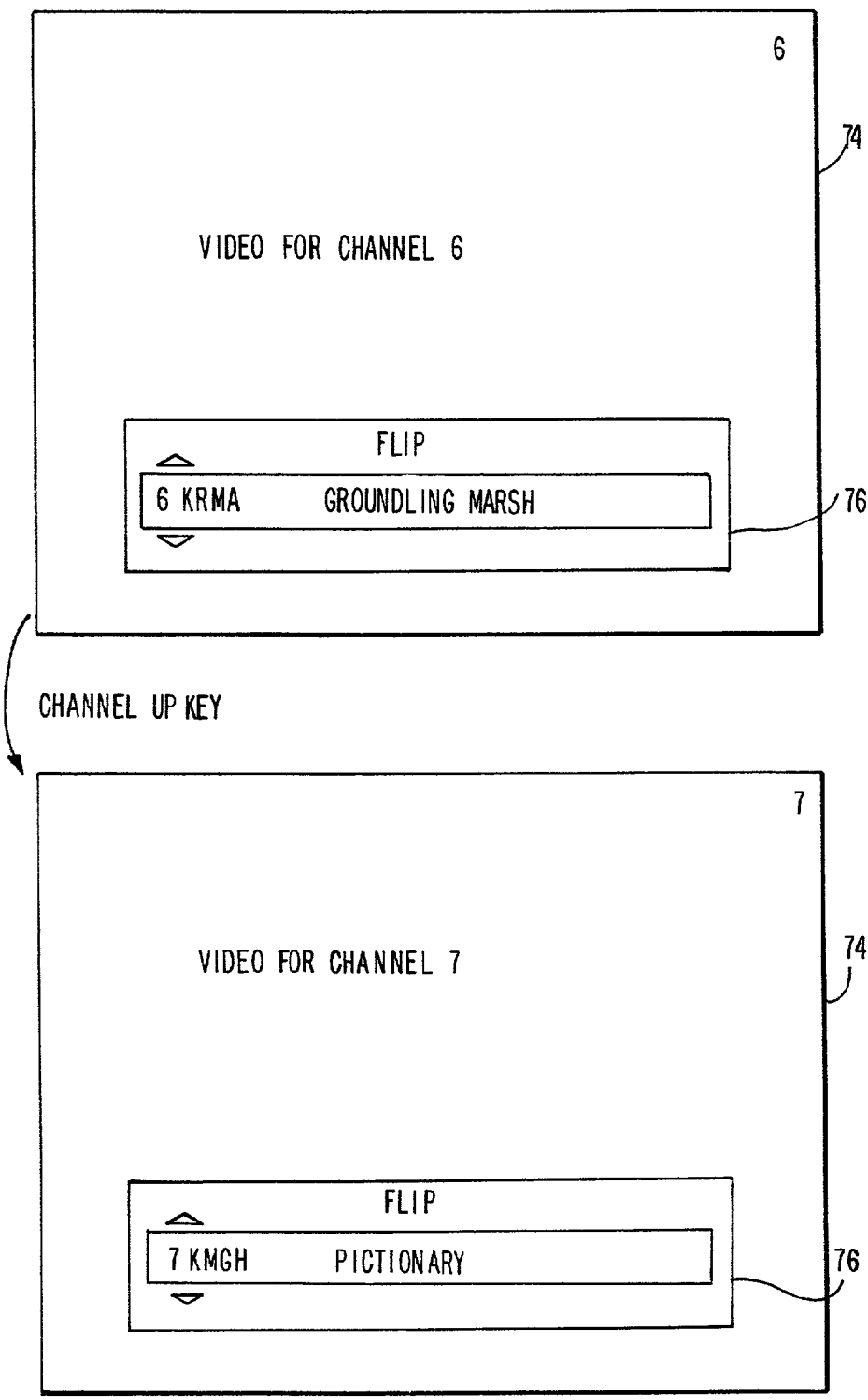
FIG. 5 is a diagram illustrating the operation of conventional flip displays.

A conventional flip display arrangement is shown in FIG. 5. Video for the current channel to which the user is tuned is displayed on screen 74. When the user presses a remote control channel up or down key, flip display 76 is provided as an overlay on top of screen 74. As shown on the upper screen in FIG. 5, flip display 76 contains program listings information for the current channel (e.g., channel 6). If the user presses a channel up or down key, the video for the current channel that is displayed on screen 74 is changed to the next available channel (e.g., channel 7) and the program listings information in flip display 76 is also changed to the next available channel (e.g., channel 7), as shown on the lower screen in FIG. 4.

As shown in FIGS. 4 and 5, in one mode (browse mode) the program guide provides a program listings overlay (the browse display) that is allowed to go out of synchronization with the current channel, whereas in another mode (flip mode) the program guide provides a program listings overlay (the flip display) in which the current channel and the program listings information in the overlay remain in synchronization. The user may operate the program guide in either browse mode or flip mode by using the appropriate remote control keys (e.g., cursor keys for browse mode and channel up and down keys for flip mode).

Figure 6:
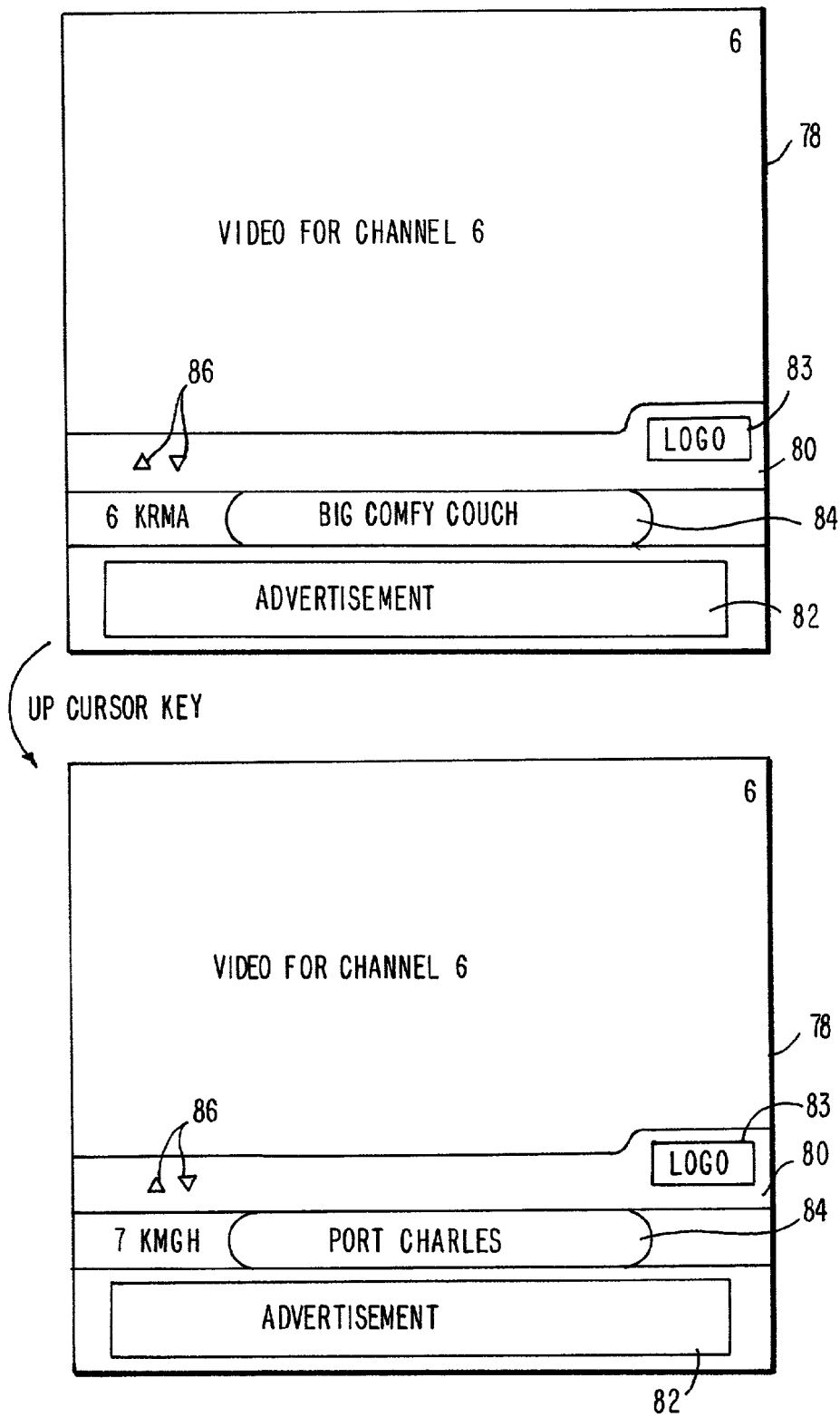
FIG. 6 is a diagram of an illustrative browse display containing an advertisement in accordance with the present invention.

In accordance with the present invention, the program guide provides browse and flip displays that contain advertisements. An illustrative browse display that may be provided by the program guide is shown in FIG. 6. Video for the current channel to which the user (i.e., set-top box 48 of FIG. 1) is tuned is displayed on screen 78. When the user presses a suitable key such as a remote control cursor key 62 (FIG. 3), the program guide implemented on user television equipment 44 of FIG. 1 provides browse display 80 as an overlay on top of screen 78 (which may be, e.g., the screen of television 52 of FIG. 1). Browse display 80 contains advertisement 82 and may contain a logo 83. Advertisement 82 may contain text, graphics (including animation), and video. Advertisement 82 may be a programming-related advertisement that is used to promote a television program or channel or may be a conventional advertisement used to promote non-programming products and services. If desired, advertisement 82 may be selectable by the user (e.g., using remote control keys). If advertisement 82 is selectable, the program guide may take various actions upon selection of advertisement 82 by the user. The content of advertisement 82 may be cycled (i.e., replaced periodically by another advertisement). A fade may be provided between advertisements as they are cycled.

When browse display 80 is initially invoked by the user by pressing a cursor key 62, browse display 80 contains program listing 84 for the current channel (e.g., channel 6) and time, as shown on the upper screen in FIG. 6. If the user presses a cursor key 62, the video for the current channel that is displayed on screen 78 is not changed, but the program listing 84 in browse display 80 is changed to the next available channel (e.g., channel 7), as shown on the lower screen in FIG. 6. As indicated by arrows 86, the user may use cursor keys to browse program listing for various other channels without disturbing the video for the current channel that is displayed on screen 78. If the user locates a program of interest with browse display 80, the user may press "OK" key 64 to direct the program guide to tune to the channel for that program.

Figure 7:
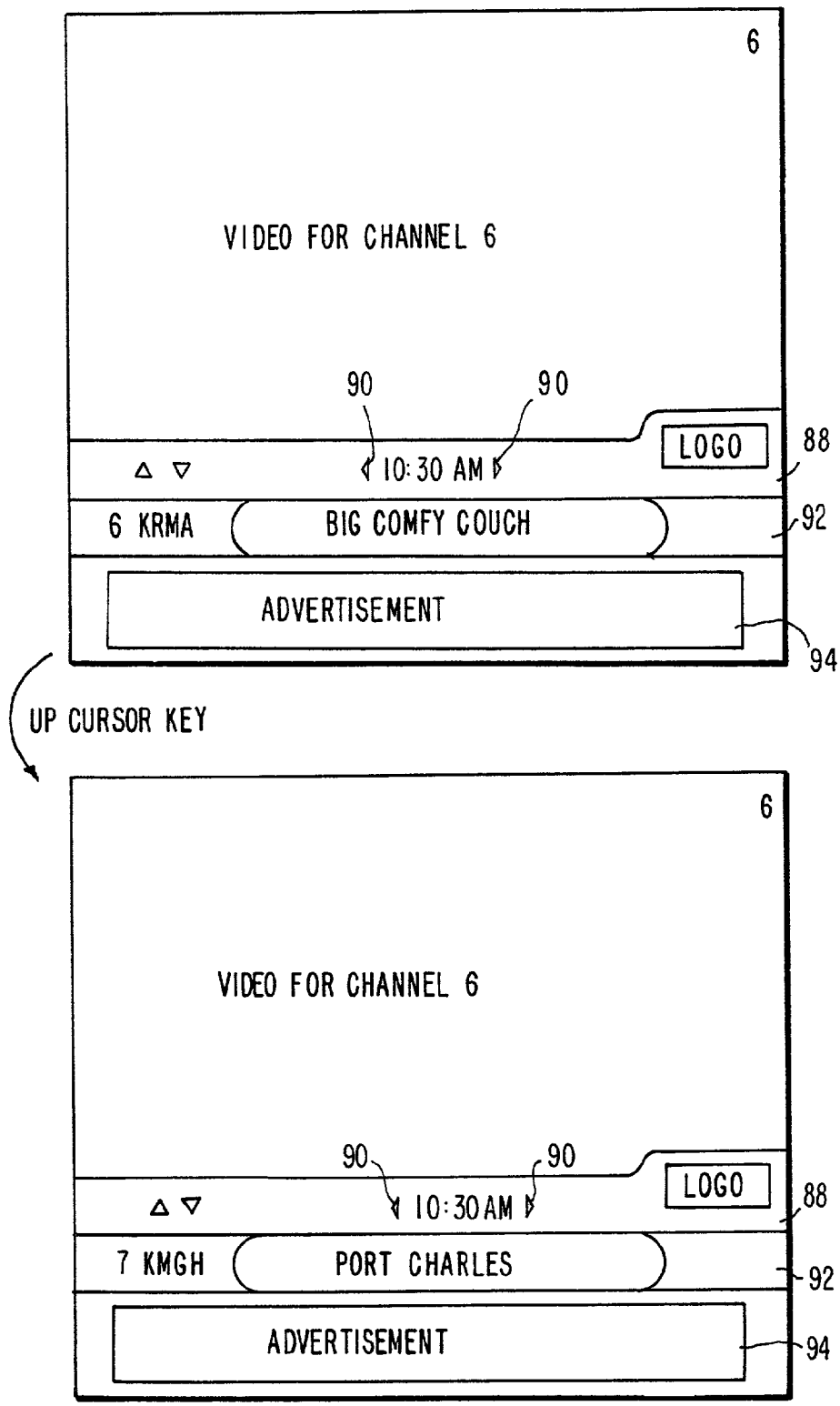
FIG. 7 is a diagram of another illustrative browse display containing an advertisement in accordance with the present invention.

As shown in FIG. 7, the program guide may provide a browse display 88 that allows the user to browse program listings for programs that are scheduled to be aired at times other than the current time. Arrow keys 90 indicate that the user may use left and right cursor keys 62 to direct the program guide to display program listings information 92 for different times. Pressing the "OK" key 64 when the program in browse display 88 is a future program may direct the program guide to provide an opportunity to set a reminder for the program or to schedule a recording of the program. As with the arrangement of FIG. 6, browse display 88 of FIG. 7 contains an advertisement 94.

Figure 8:
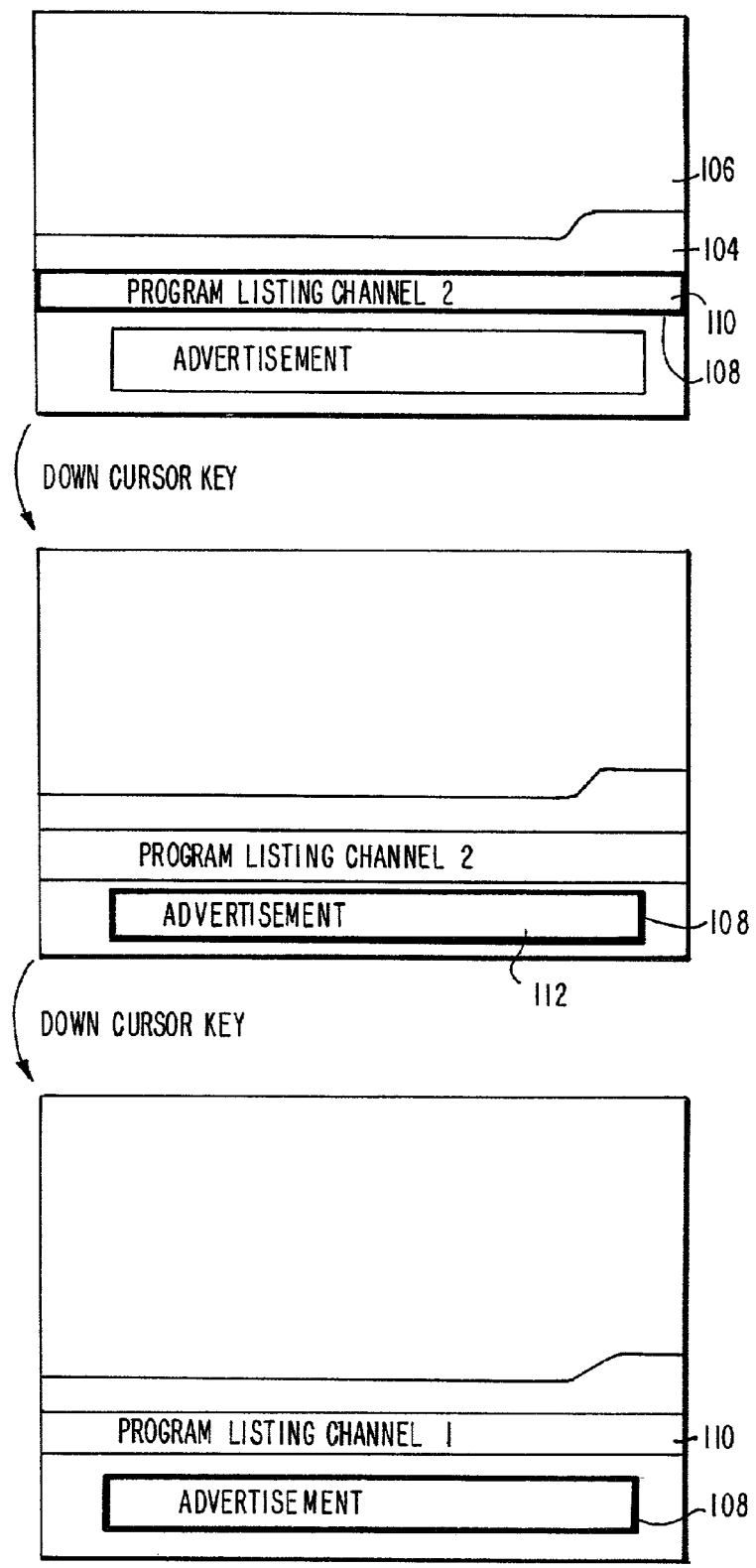
FIG. 8 is a diagram illustrating how a browse display containing an advertisement may be provided with a highlight that may be navigated to the advertisement in accordance with the present invention.

If advertisements such as advertisements 82 and 94 are selectable, the browse display may be provided with a movable highlight as shown in FIG. 8. When browse display 104 of FIG. 8 is initially overlaid on screen 106 (e.g., when the user first presses a cursor key 64), the program guide provides a highlight 108 positioned on program listing 110, as shown in the upper screen of FIG. 8. If the user presses an up cursor key 62, program listing 110 is changed to the program listing for the next available channel and highlight 108 remains positioned on the listing. If the user presses a down cursor key 62, program listing 110 is not changed. However, highlight 108 is positioned on advertisement 112, as shown in the center screen of FIG. 8. Further activation of the down cursor key 62 directs the program guide to replace the existing program listing 110 (e.g., the program listing for channel 2) with the program listing for the previous channel (e.g., the program listing for channel 1), as shown in the lower screen of FIG. 8. When the browse display is as shown in the lower screen of FIG. 8, further activation of the down cursor key 62 scrolls the program listings further, but does not move highlight 108. Activation of the up cursor key 62 when the browse display is as shown in the lower screen of FIG. 8 moves highlight 108 back to program listing 110, without changing the channel for the program listing 110.

Another way in which the program guide may allow the user to select advertisements such as advertisements 82 and 94 is to provide a special remote control button. Left and right cursor keys may be used to access advertisements (e.g., panel advertisements to the left or right of the program listing) if desired.

Figure 9:
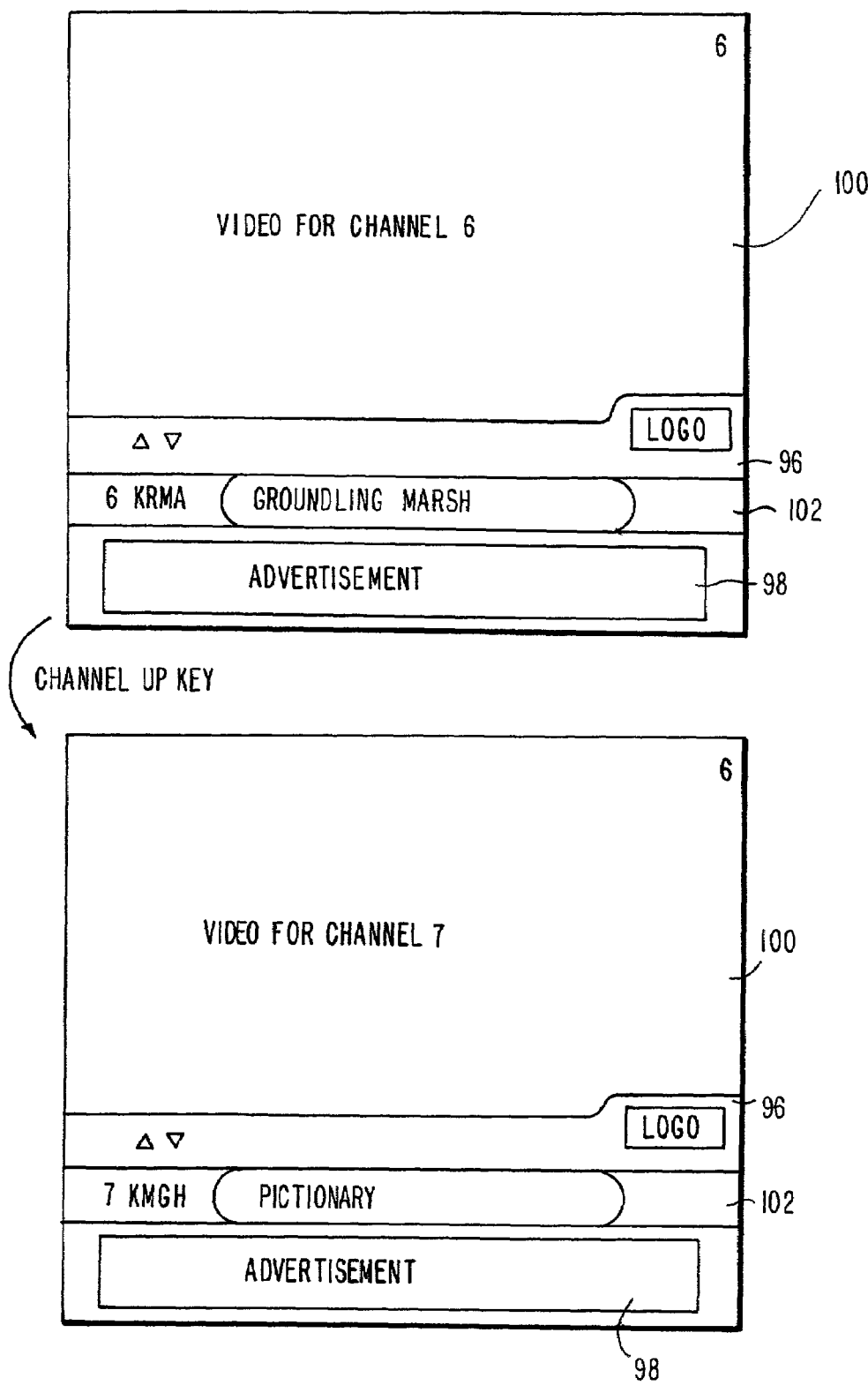
FIG. 9 is a diagram of an illustrative flip display containing an advertisement in accordance with the present invention.

A program guide flip display 96 containing an advertisement 98 is shown in FIG. 9. Video for the current channel to which the user (i.e., set-top box 48) is tuned is displayed on screen 100. When the user presses a suitable key such as a channel up or down key 66 (FIG. 3), flip display 96 is provided as an overlay on top of screen 100. As shown on the upper screen in FIG. 9, flip display 96 contains a program listing 102 for the current channel (e.g., channel 6). If the user presses a channel up or down key 66, the video for the current channel that is displayed on screen 100 is changed to the next available channel (e.g., channel 7) and the program listing 102 in flip display 96 is changed to the next available channel (e.g., channel 7), as shown on the lower screen in FIG. 9.

Another aspect of the invention involves removing program listings displays such as browse and flip displays from the screen. Browse displays may be removed after a period of inactivity (e.g., 5 minutes) that indicates that the user is no longer interested in browsing the program listings. The flip display (which may appear automatically whenever the user changes channels with the channel keys) may be removed after a shorter period of time (e.g., 5 seconds).

Figure 10:
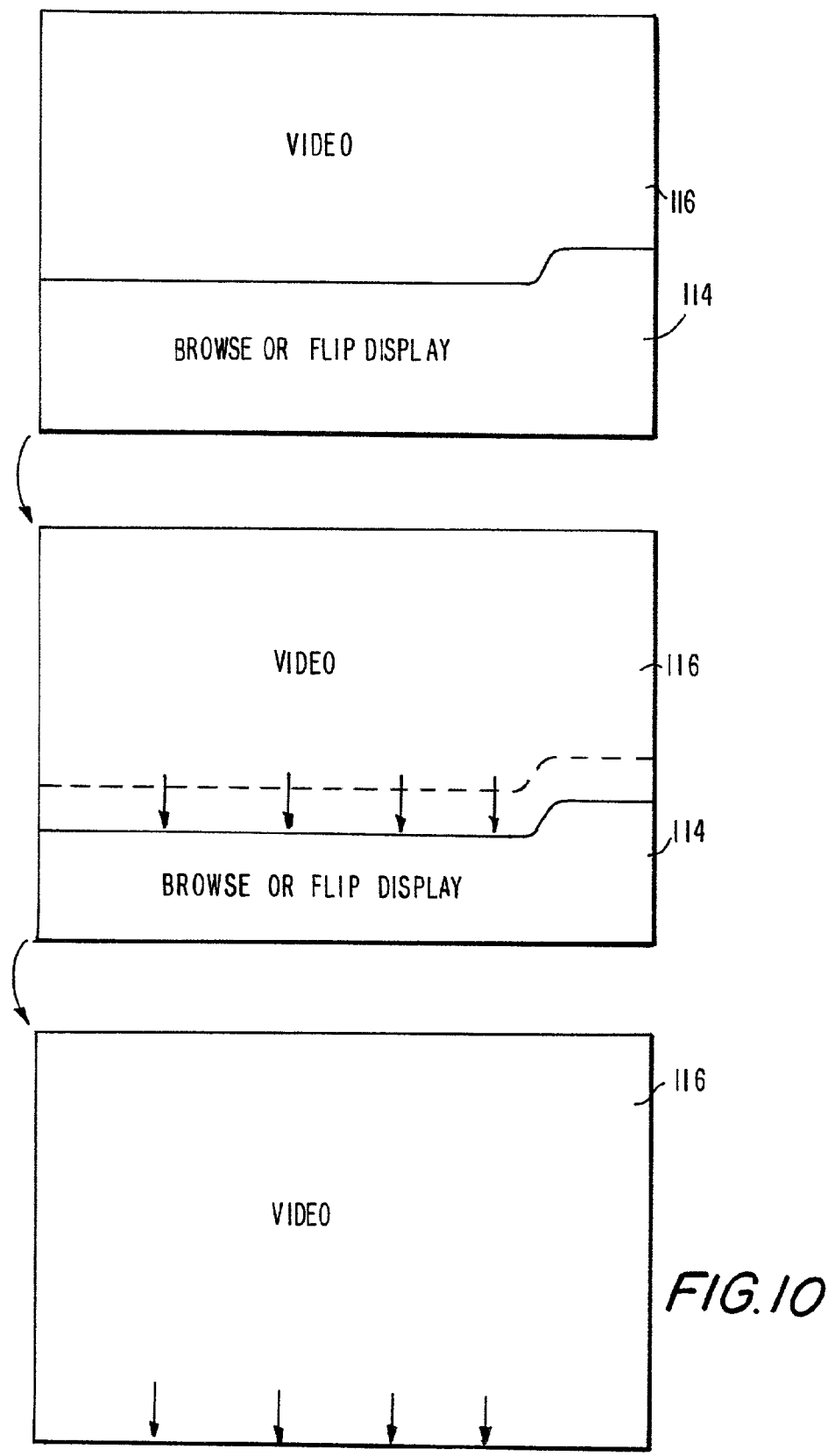
FIG. 10 is a diagram illustrating how a browse or flip display may be removed from the user's television screen using a special effect.

The program guide may remove program listings displays such as browse and flip displays from the screen using special effects. One such special effect (a vertical glide) is illustrated in FIG. 10. A full-size browse or flip display 114 is shown overlaid on the upper screen 116 of FIG. 10. After a suitable time period (e.g., after 5 minutes if display 114 is a browse display or after 5 seconds if display 114 is a flip display), the program guide smoothly glides display 114 off of screen 116, as shown in the center and lower screens 116 of FIG. 10.

The glide effect shown in FIG. 10 is only one illustrative special effect that may be used to remove program listings displays from the screen. Any suitable special effect may be used to remove such displays. Examples of suitable special effects include glides, dissolves, collapses, bounces, explosions, etc.

Figure 11:
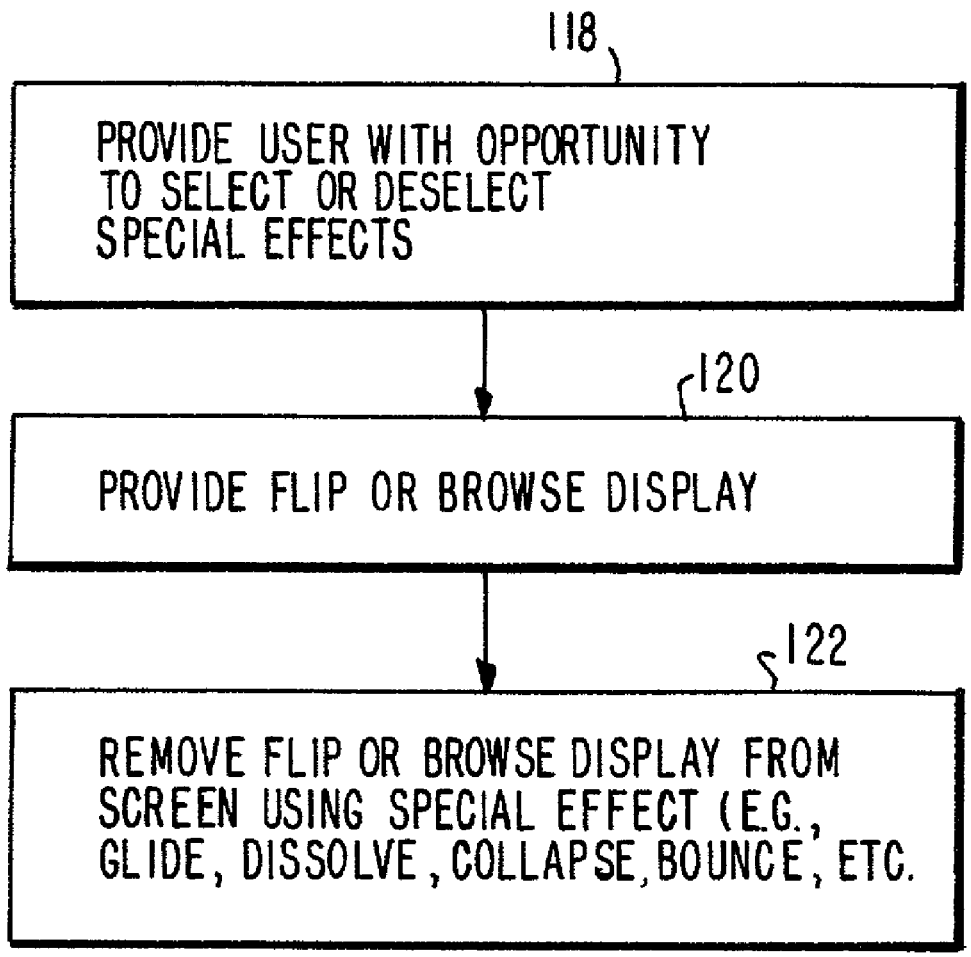
FIG. 11 is a flow chart illustrating steps involved in providing flip and browse displays and in removing such displays from the user's television screen using special effects.

Steps involved in using such special effects to remove a program listings display from the screen are shown in FIG. 11. At step 118, the program guide provides the user with an opportunity to select a desired special effect for the program guide to use in removing program listings. The user may make this selection from a suitable setup menu in the program guide. The user is also provided with an opportunity to deselect or otherwise cancel the use of these special effects. At step 120, the program guide provides a program listings display such as a flip or browse display on a screen (e.g., the user's television screen) in user television equipment 44. After a suitable time period (e.g., after 5 minutes if display 114 is a browse display or after 5 seconds if display 114 is a flip display), the program guide removes the program listings display (e.g., the flip or browse display) from the screen using a special effect at step 122. The program guide may use a default special effect at step 122 or may use a special effect selected by the user at step 118.

Figure 12:
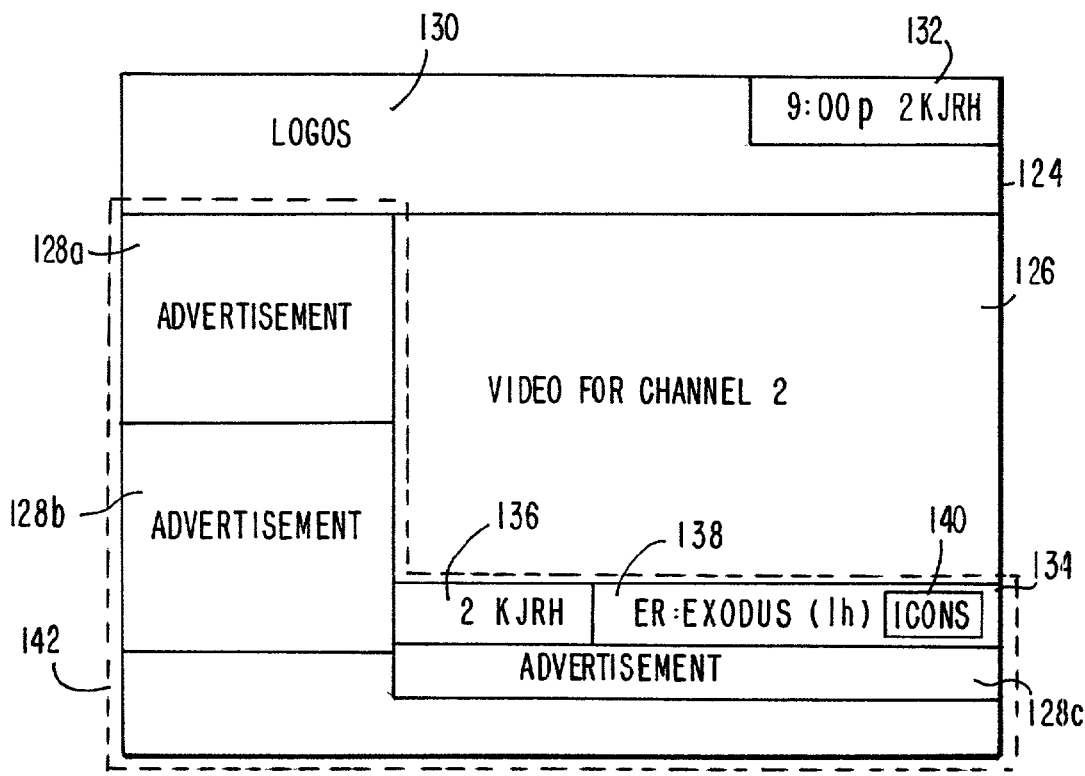
FIG. 12 is a diagram of another illustrative flip or browse display in accordance with the present invention.

Another browse and flip display arrangement containing advertising is shown in FIG. 12. Screen 124 contains a reduced-size video window 126 containing video for the channel to which the user (i.e., set-top box 48) is tuned. Screen 124 also contains advertisements 128a, 128b, and 128c. Logos 130 and a region 132 containing the current time and current channel may also be contained in screen 124. Program listing 134 may be provided in screen 124 adjacent to reduced-size video window 126. Program listing 134 may contain channel information 136, title information 138, and icons 140 (e.g., for showing ratings information, close-captioning status, etc.).

Like the browse and flip program listings display regions shown in FIGS. 6–9, program listings display region 142 contains a single program listing (for the program "ER" in the example of FIG. 12) and may contain one or more advertisements if desired. However, because video window 126 is reduced in size (i.e., it occupies less than a full screen), it is not necessary to overlay program listings display region 142 on top of the current channel.

Program listings display region 142 may operate in either browse mode or flip mode. The user may invoke the browse mode by activating a cursor key or other suitable key. Further use of the cursor key in browse mode directs the program guide to change the program listing 134 to a new channel without changing the channel for video window 126. If desired, left and right cursor keys may be used to browse program listings for different times. Activating "OK" key 64 directs the program guide to tune the channel for video window 124 to the channel of the current program listing. The user may invoke the flip mode by activating a channel up or down key or other suitable key. Further use of the channel up or down key in the flip mode directs the program guide to change the channel for both video window 126 and program listing 134 simultaneously. If desired, advertisement 128c may be omitted to provide more space for listing 134 and video window 126. The user may navigate to panel advertisements such as advertisements 128a and 128b using special (e.g., dedicated or numeric) remote control buttons or by using the left and right cursor keys (in which case the left and right cursor keys are not used for browsing program listings at different times).

Figure 13:
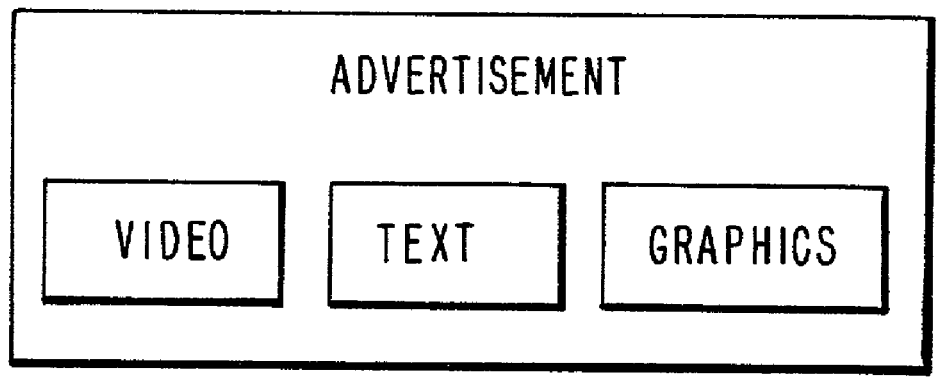
FIG. 13 is a diagram of an illustrative advertisement in accordance with the present invention.

As shown in FIG. 13, advertisements such as the advertisements in the program listings display regions shown in FIGS. 6–9 and 12 may contain video text and graphics. More than one advertisement may be displayed in each program listings display if desired.

Advertisements such as those shown in FIGS. 6–9 and 12 may be selectable. The user may navigate to a selectable ad using any suitable arrangement, such as using special remote control navigation keys. Once the user has navigated to a given advertisement, the user may select that advertisement using an "OK" key. Any other suitable technique for selecting an advertisement may be used if desired.

Figure 14:
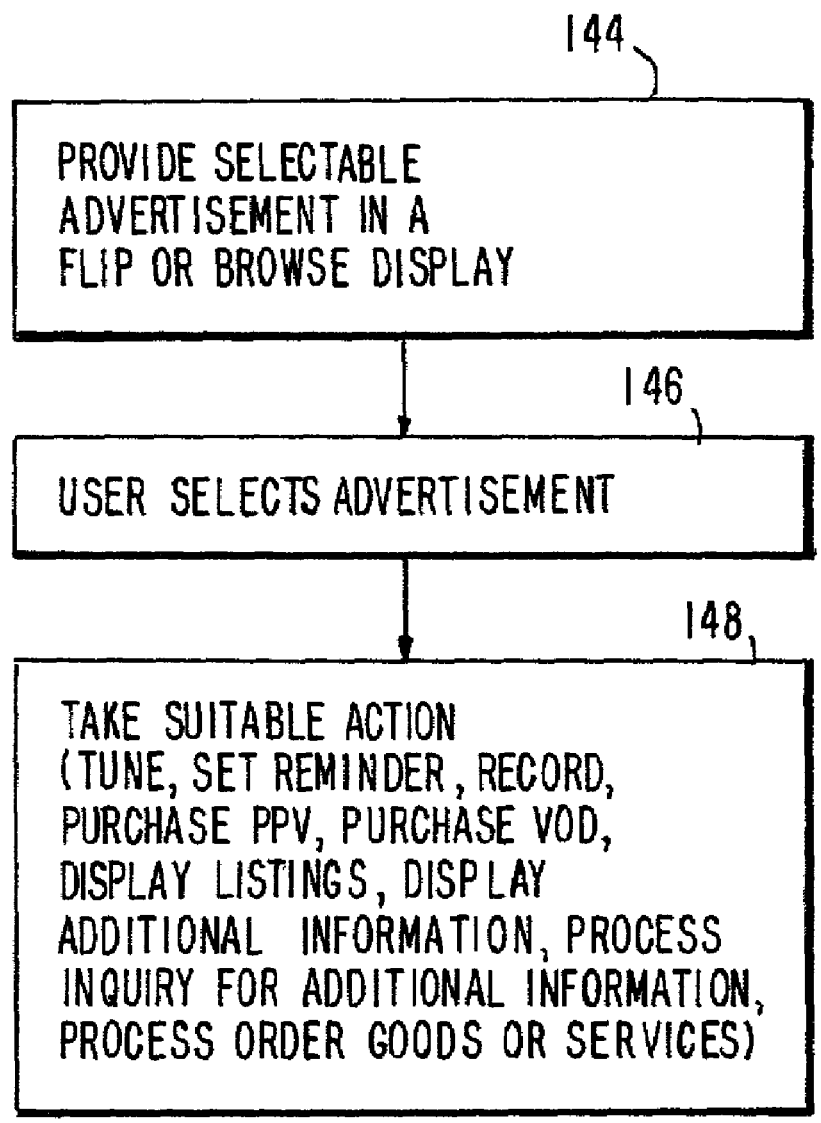
FIG. 14 is a flow chart of steps involved in providing a selectable advertisement and taking suitable actions in the program guide in response to selection of the advertisement by a user in accordance with the present invention.

Steps involved in using selectable advertisements are shown in FIG. 14. At step 144, the program guide provides a selectable advertisement in a flip or browse display. At step 146, the user selects the advertisement. At step 148, the program guide takes a suitable action. If the advertisement is for a television program that is currently being aired, the program guide may provide the user with an opportunity to tune to that program. If the advertisement is for a future television program, the program guide may provide the user with an opportunity to set a reminder for that program. If desired, the program guide may provide the user with an opportunity to have the program recorded. Pay-per-view and video-on-demand (VOD) programs may be ordered. When an advertisement is for a particular television channel, selecting the advertisement may direct the program guide to provide the user with a list of programs for that channel. Additional information (e.g., on a program, product, or service) may be requested by selecting certain advertisements. Brochure and literature requests and other such inquiries for additional information may be handled by the program guide at step 148 if the user selects an advertisement involving such an inquiry. Selectable advertisements may also be provided that promote goods and services. If the user selects such an advertisement at step 146, the program guide system may process an order for the goods or services being advertised at step 148.

The foregoing is merely illustrative of the principles of this invention and various modifications can be made by those skilled in the art without departing from the scope and spirit of the invention.

What is claimed is:

1. A method for using an interactive television program guide to display program schedule information, the method comprising:
   displaying, on a display, video for a given television channel;
   displaying over the video for the given television channel an overlay comprising program listings information for a single television channel and additional information, wherein the overlay comprises one of: a browse display and a flip display; and
   allowing the user to navigate a highlight region between the program listings information and the additional information.

2. The method of claim 1 wherein the additional information comprises at least one advertisement.

3. The method of claim 2 wherein the at least one advertisement comprises a selectable advertisement.

4. The method of claim 1 wherein the additional information comprises additional information containing text.

5. The method of claim 1 wherein the additional information comprises additional information containing graphics.

6. The method of claim 1 wherein the additional information comprises additional information containing video.

7. The method of claim 1 further comprising cycling the content of the additional information.

8. The method of claim 1 further comprising:
cycling the content of the additional information; and
providing a fade between the content of the additional information as it is cycled.

9. The method of claim 1 further comprising removing the overlay using special effects.

10. The method of claim 1 wherein displaying program listings information comprises displaying program listings information that is associated with a different television channel than the given television channel.

11. The method of claim 1 wherein the additional information comprises at least one advertisement that promotes a television program, the method further comprising recording the program when the at least one advertisement is selected.

12. The method of claim 1 wherein the additional information comprises at least one advertisement that promotes a television program, the method further comprising setting a reminder when the at least one advertisement is selected.

13. The method of claim 1 wherein the additional information comprises at least one logo.

14. The method of claim 1 wherein allowing the user to navigate the highlight region between the program listings information and the additional information comprises:
allowing the user to navigate the highlight region between the program listings information and the additional information by issuing a user control command associated with a particular direction; and
allowing the user to issue the same user control command associated with the particular direction, causing the program listings information to change to different program listings information.

15. The method of claim 14 further comprising allowing the user to repeatedly issue the same user control command associated with the particular direction, causing the program listings information to change to different program listings information each time.

16. The method of claim 1 wherein the program listings information comprises at least one program listing.

17. A system in which an interactive television program guide is implemented, wherein the interactive television program guide is used to display program schedule information, the system comprising:
means for displaying, on a display, video for a given television channel;
means for displaying over the video for the given television channel an overlay comprising program listings information for a single television channel and additional information, wherein the overlay comprises one of: a browse display and a flip display; and
means for allowing the user to navigate a highlight region between the program listings information and the additional information.

18. The system of claim 17 wherein the additional information comprises at least one advertisement.

19. The system of claim 18 wherein the at least one advertisement comprises a selectable advertisement.

20. The system of claim 17 wherein the additional information comprises additional information containing text.

21. The system of claim 17 wherein the additional information comprises additional information containing graphics.

22. The system of claim 17 wherein the additional information comprises additional information containing video.

23. The system of claim 17 further comprising means for cycling the content of the additional information.

24. The system of claim 17 further comprising:
means for cycling the content of the additional information; and
means for providing a fade between the content of the additional information as it is cycled.

25. The system of claim 17 further comprising means for removing the overlay using special effects.

26. The system of claim 17 wherein the program listings information comprises program listings information that is associated with a different television channel than the given television channel.

27. The system of claim 17 wherein the additional information comprises at least one advertisement that promotes a television program, the method further comprising means for recording the program when the at least one advertisement is selected.

28. The system of claim 17 wherein the additional information comprises at least one advertisement that promotes a television program, the method further comprising means for setting a reminder when the at least one advertisement is selected.

29. The system of claim 17 wherein the additional information comprises at least one logo.

30. The system of claim 17 wherein the means for allowing the user to navigate the highlight region between the program listings information and the additional information comprises:
means for allowing the user to navigate the highlight region between the program listings information and the additional information by issuing a user control command associated with a particular direction; and
means for allowing the user to issue the same user control command associated with the particular direction, causing the program listings information to change to different program listings information.

31. The system of claim 30 further comprising means for allowing the user to repeatedly issue the same user control command associated with the particular direction, causing the program listings information to change to different program listings information each time.

32. The system of claim 17 wherein the program listings information comprises at least one program listing.

33. A system in which an interactive television program guide is implemented, wherein the interactive television program guide is used to display program schedule information, the system comprising:
a display; and
user television equipment configured to:
display, on the display, video for a given television channel,
display over the video for the given television channel an overlay comprising program listings information for a single television channel and additional information, wherein the overlay comprises one of: a browse display and a flip display, and
allow the user to navigate a highlight region between the program listings information and the additional information.

34. The system of claim 33 wherein the additional information comprises at least one advertisement.

35. The system of claim 34 wherein the at least one advertisement comprises a selectable advertisement.

36. The system of claim 33 wherein the additional information comprises text.

37. The system of claim 33 wherein the additional information comprises graphics.

38. The system of claim 33 wherein the additional information comprises video.

39. The system of claim 33 wherein the user television equipment is further configured to cycle the content of the additional information.

40. The system of claim 33 wherein the user television equipment is further configured to:
- cycle the content of the additional information; and
- provide a fade between the content of the additional information as it is cycled.

41. The system of claim 33 wherein the user television equipment is further configured to remove the overlay using special effects.

42. The system of claim 33 wherein the program listings information is associated with a different television channel than the given television channel.

43. The system of claim 33 wherein the additional information comprises at least one advertisement that promotes a television program, the user television equipment further configured to record the program when the at least one advertisement is selected.

44. The system of claim 33 wherein the additional information comprises at least one advertisement that promotes a television program, the user television equipment further configured to set a reminder when the at least one advertisement is selected.

45. The system of claim 33 wherein the additional information comprises at least one logo.

46. The system of claim 33 wherein the user television equipment is further configured to:
- allow the user to navigate the highlight region between the program listings information and the additional information by issuing a user control command associated with a particular direction; and
- allow the user to issue the same user control command associated with the particular direction, causing the program listings information to change to different program listings information.

47. The system of claim 46 wherein the user television equipment is further configured to allow the user to repeatedly issue the same user control command associated with the particular direction, causing the program listings information to change to different program listings information each time.

48. The system of claim 33 wherein the program listings information comprises at least one program listing.

49. Machine-readable media for use in an interactive television program guide system in which an interactive television program guide that displays program listings information is implemented on user television equipment, wherein the media is encoded with machine-readable instructions for performing the method comprising:
- displaying, on a display, video for a given television channel;
- displaying over the video for the given television channel an overlay comprising program listings information for a single television channel and additional information, wherein the overlay comprises one of: a browse display and a flip display; and
- allowing the user to navigate a highlight region between the program listings information and the additional information.

50. The machine-readable media of claim 49 wherein the additional information comprises at least one advertisement.

51. The machine-readable media of claim 50 wherein the at least one advertisement comprises a selectable advertisement.

52. The machine-readable media of claim 49 wherein the additional information comprises additional information containing text.

53. The machine-readable media of claim 49 wherein the additional information comprises additional information containing graphics.

54. The machine-readable media of claim 49 wherein the additional information comprises additional information containing video.

55. The machine-readable media of claim 49 further comprising cycling the content of the additional information.

56. The machine-readable media of claim 49 further encoded with machine-readable instructions for:
- cycling the content of the additional information; and
- providing a fade between the content of the additional information as it is cycled.

57. The machine-readable media of claim 49 further encoded with machine-readable instructions for removing the overlay using special effects.

58. The machine-readable media of claim 49 wherein the program listings information comprises program listings information that is associated with a different television channel than the given television channel.

59. The machine-readable media of claim 49 wherein the additional information comprises at least one advertisement that promotes a television program, the machine-readable media further encoded with machine-readable instructions for recording the program when the at least one advertisement is selected.

60. The machine-readable media of claim 49 wherein the additional information comprises at least one advertisement that promotes a television program, the machine-readable media further encoded with machine-readable instructions for setting a reminder when the at least one advertisement is selected.

61. The machine-readable media of claim 49 wherein the additional information comprises at least one logo.

62. The machine-readable media of claim 49 further encoded with machine-readable instructions for:
- allowing the user to navigate the highlight region between the program listings information and the additional information by issuing a user control command associated with a particular direction; and
- allowing the user to issue the same user control command associated with the particular direction, causing the program listings information to change to different program listings information.

63. The machine-readable media of claim 63 further encoded with machine-readable instructions for allowing the user to repeatedly issue the same user control command associated with the particular direction, causing the program listings information to change to different program listings information each time.

64. The machine-readable media of claim 49 wherein the program listings information comprises at least one program listing.

65. A method for using an interactive television program guide to display program schedule information, the method comprising:
- displaying, on a display, video for a given television channel;
- displaying over the video for the given television channel an overlay comprising program listings information for a single television channel and additional information, wherein the additional information comprises at least one advertisement; and allowing the user to navigate a highlight region between the program listings information and the additional information.

66. The method of claim 65 wherein the at least one advertisement comprises a selectable advertisement.

67. The method of claim 65 wherein the additional information comprises additional information containing text.

68. The method of claim 65 wherein the additional information comprises additional information containing graphics.

69. The method of claim 65 wherein the additional information comprises additional information containing video.

70. The method of claim 65 further comprising cycling the content of the additional information.

71. The method of claim 65 further comprising:
cycling the content of the additional information; and
providing a fade between the content of the additional information as it is cycled.

72. The method of claim 65 further comprising removing the overlay using special effects.

73. The method of claim 65 wherein displaying program listings information comprises displaying program listings information that is associated with a different television channel than the given television channel.

74. The method of claim 65 wherein the additional information comprises at least one advertisement that promotes a television program, the method further comprising recording the program when the at least one advertisement is selected.

75. The method of claim 65 wherein the additional information comprises at least one advertisement that promotes a television program, the method further comprising setting a reminder when the at least one advertisement is selected.

76. The method of claim 65 wherein the additional information comprises at least one logo.

77. The method of claim 65 wherein allowing the user to navigate the highlight region between the program listings information and the additional information comprises:
allowing the user to navigate the highlight region between the program listings information and the additional information by issuing a user control command associated with a particular direction; and
allowing the user to issue the same user control command associated with the particular direction, causing the program listings information to change to different program listings information.

78. The method of claim 77 further comprising allowing the user to repeatedly issue the same user control command associated with the particular direction, causing the program listings information to change to different program listings information each time.

79. The method of claim 65 wherein the program listings information comprises at least one program listing.

80. A system in which an interactive television program guide is implemented, wherein the interactive television program guide is used to display program schedule information, the system comprising:
means for displaying, on a display, video for a given television channel;
means for displaying over the video for the given television channel an overlay comprising program listings information for a single television channel and additional information, wherein the additional information comprises at least one advertisement; and
means for allowing the user to navigate a highlight region between the program listings information and the additional information.

81. The system of claim 80 wherein the at least one advertisement comprises a selectable advertisement.

82. The system of claim 80 wherein the additional information comprises additional information containing text.

83. The system of claim 80 wherein the additional information comprises additional information containing graphics.

84. The system of claim 80 wherein the additional information comprises additional information containing video.

85. The system of claim 80 further comprising means for cycling the cYontent of the additional information.

86. The system of claim 80 further comprising:
means for cycling the content of the additional information; and
means for providing a fade between the content of the additional information as it is cycled.

87. The system of claim 80 further comprising means for removing the overlay using special effects.

88. The system of claim 80 wherein the program listings information comprises program listings information that is associated with a different television channel than the given television channel.

89. The system of claim 80 wherein the additional information comprises at least one advertisement that promotes a television program, the method further comprising means for recording the program when the at least one advertisement is selected.

90. The system of claim 80 wherein the additional information comprises at least one advertisement that promotes a television program, the method further comprising means for setting a reminder when the at least one advertisement is selected.

91. The system of claim 80 wherein the additional information comprises at least one logo.

92. The system of claim 80 wherein the means for allowing the user to navigate the highlight region between the program listings information and the additional information comprises:
means for allowing the user to navigate the highlight region between the program listings information and the additional information by issuing a user control command associated with a particular direction; and
means for allowing the user to issue the same user control command associated with the particular direction, causing the program listings information to change to different program listings information.

93. The system of claim 92 further comprising means for allowing the user to repeatedly issue the same user control command associated with the particular direction, causing the program listings information to change to different program listings information each time.

94. The system of claim 80 wherein the program listings information comprises at least one program listing.

95. A system in which an interactive television program guide is implemented, wherein the interactive television program guide is used to display program schedule information, the system comprising:
a display; and
user television equipment configured to:
display, on the display, video for a given television channel,
display over the video for the given television channel an overlay comprising program listings information for a single television channel and additional information, wherein the additional information comprises at least one advertisement, and allow the user to navigate a highlight region between the program listings information and the additional information.

96. The system of claim 95 wherein the at least one advertisement comprises a selectable advertisement.

97. The system of claim 95 wherein the additional information comprises text.

98. The system of claim 95 wherein the additional information comprises graphics.

99. The system of claim 95 wherein the additional information comprises video.

100. The system of claim 95 wherein the user television equipment is further configured to cycle the content of the additional information.

101. The system of claim 95 wherein the user television equipment is further configured to:
cycle the content of the additional information; and
provide a fade between the content of the additional information as it is cycled.

102. The system of claim 95 wherein the user television equipment is further configured to remove the overlay using special effects.

103. The system of claim 95 wherein the program listings information is associated with a different television channel than the given television channel.

104. The system of claim 95 wherein the additional information comprises at least one advertisement that promotes a television program, the user television equipment further configured to record the program when the at least one advertisement is selected.

105. The system of claim 95 wherein the additional information comprises at least one advertisement that promotes a television program, the user television equipment further configured to set a reminder when the at least one advertisement is selected.

106. The system of claim 95 wherein the additional information comprises at least one logo.

107. The system of claim 95 wherein the user television equipment is further configured to:
allow the user to navigate the highlight region between the program listings information and the additional information by issuing a user control command associated with a particular direction; and
allow the user to issue the same user control command associated with the particular direction, causing the program listings information to change to different program listings information.

108. The system of claim 107 wherein the user television equipment is further configured to allow the user to repeatedly issue the same user control command associated with the particular direction, causing the program listings information to change to different program listings information each time.

109. The system of claim 95 wherein the program listings information comprises at least one program listing.

110. Machine-readable media for use in an interactive television program guide system in which an interactive television program guide that displays program listings information is implemented on user television equipment, wherein the media is encoded with machine-readable instructions for performing the method comprising:
displaying, on a display, video for a given television channel;
displaying over the video for the given television channel an overlay comprising program listings information for a single television channel and additional information, wherein the additional information comprises at least one advertisement; and
allowing the user to navigate a highlight region between the program listings information and the additional information.

111. The machine-readable media of claim 110 wherein the at least one advertisement comprises a selectable advertisement.

112. The machine-readable media of claim 110 wherein the additional information comprises additional information containing text.

113. The machine-readable media of claim 110 wherein the additional information comprises additional information containing graphics.

114. The machine-readable media of claim 110 wherein the additional information comprises additional information containing video.

115. The machine-readable media of claim 110 further comprising cycling the content of the additional information.

116. The machine-readable media of claim 110 further encoded with machine-readable instructions for:
cycling the content of the additional information; and
providing a fade between the content of the additional information as it is cycled.

117. The machine-readable media of claim 110 further encoded with machine-readable instructions for removing the overlay using special effects.

118. The machine-readable media of claim 110 wherein the program listings information comprises program listings information that is associated with a different television channel than the given television channel.

119. The machine-readable media of claim 110 wherein the additional information comprises at least one advertisement that promotes a television program, the machine-readable media further encoded with machine-readable instructions for recording the program when the at least one advertisement is selected.

120. The machine-readable media of claim 110 wherein the additional information comprises at least one advertisement that promotes a television program, the machine-readable media further encoded with machine-readable instructions for setting a reminder when the at least one advertisement is selected.

121. The machine-readable media of claim 110 wherein the additional information comprises at least one logo.

122. The machine-readable media of claim 110 further encoded with machine-readable instructions for:
allowing the user to navigate the highlight region between the program listings information and the additional information by issuing a user control command associated with a particular direction; and
allowing the user to issue the same user control command associated with the particular direction, causing the program listings information to change to different program listings information.

123. The machine-readable media of claim 122 further encoded with machine-readable instructions for allowing the user to repeatedly issue the same user control command associated with the particular direction, causing the program listings information to change to different program listings information each time.

124. The machine-readable media of claim 110 wherein the program listings information comprises at least one program listing.

* * * * *